(12) United States Patent
Kato

(10) Patent No.: US 10,958,763 B2
(45) Date of Patent: *Mar. 23, 2021

(54) INFORMATION PROCESSING APPARATUS, CONTROL METHOD, AND RECORDING MEDIUM

(71) Applicant: CANON KABUSHIKI KAISHA, Tokyo (JP)

(72) Inventor: Hisashi Kato, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/279,749

(22) Filed: Feb. 19, 2019

(65) Prior Publication Data

US 2019/0182354 A1   Jun. 13, 2019

Related U.S. Application Data

(63) Continuation of application No. 15/438,609, filed on Feb. 21, 2017, now Pat. No. 10,250,719.

(30) Foreign Application Priority Data

Feb. 26, 2016   (JP) ................................. 2016-036298

(51) Int. Cl.
*H04L 29/08*    (2006.01)
*H04W 4/50*     (2018.01)
(Continued)

(52) U.S. Cl.
CPC .......... *H04L 67/36* (2013.01); *H04N 1/00307* (2013.01); *H04W 4/50* (2018.02);
(Continued)

(58) Field of Classification Search
CPC .......... H04L 67/36; H04W 4/60; H04W 4/50; H04W 8/005; H04W 84/12;
(Continued)

(56) References Cited

U.S. PATENT DOCUMENTS 7,933,122 B2*  4/2011  Richardson .......... H05K 5/0017
                                                          361/679.55
2006/0279773 A1* 12/2006  Sakurai ................ G06F 3/1222
                                                          358/1.15
2008/0055632 A1*  3/2008  Oshiumi ............ H04N 1/00204
                                                          358/1.15
(Continued)

FOREIGN PATENT DOCUMENTS

JP   2006-190320 A   7/2006
JP   2007-065894 A   3/2007
JP   2016-024789 A   2/2016

*Primary Examiner* — Christopher M Brandt
(74) *Attorney, Agent, or Firm* — Canon U.S.A., Inc. IP Division

(57) ABSTRACT

An information processing apparatus instructs a plurality of print plug-ins having at least a printer search function to search for a printer and displays, if the plurality of print plug-ins are instructed to perform the search, a first screen which includes (1) a printer detected by search processing performed by the plurality of print plug-ins instructed to perform the search and includes (2) an object for shifting to a second screen but does not include (3) a link to a download page of a print plug-in that is not installed, and displays, in response to an instruction given to the object in the first screen, the second screen which includes (3) the link to the download page of the print plug-in that is not installed.

90 Claims, 13 Drawing Sheets

(51) Int. Cl.
*H04W 4/60* (2018.01)
*H04N 1/00* (2006.01)
*H04W 8/00* (2009.01)
*H04W 84/12* (2009.01)

(52) U.S. Cl.
CPC ............. *H04W 4/60* (2018.02); *H04W 8/005* (2013.01); *H04N 2201/0039* (2013.01); *H04N 2201/0046* (2013.01); *H04N 2201/0055* (2013.01); *H04N 2201/0094* (2013.01); *H04W 84/12* (2013.01)

(58) Field of Classification Search
CPC ....... H04N 1/00307; H04N 2201/0055; H04N 2201/0046; H04N 2201/0039; H04N 2201/0094
See application file for complete search history.

(56) References Cited

U.S. PATENT DOCUMENTS

| | | | | |
|---|---|---|---|---|
| 2009/0201547 | A1* | 8/2009 | Noguchi | H04L 12/66 358/1.15 |
| 2009/0207443 | A1* | 8/2009 | Kimura | G06F 9/4411 358/1.15 |
| 2011/0238784 | A1* | 9/2011 | Takazawa | H04N 1/00344 709/217 |
| 2011/0317211 | A1* | 12/2011 | Yamada | G06F 9/5011 358/1.15 |
| 2014/0115608 | A1* | 4/2014 | Shirasaka | G06F 9/4411 719/321 |
| 2014/0355049 | A1* | 12/2014 | Hadano | G06F 3/123 358/1.15 |
| 2016/0149885 | A1* | 5/2016 | Negoro | H04L 63/08 726/6 |

* cited by examiner

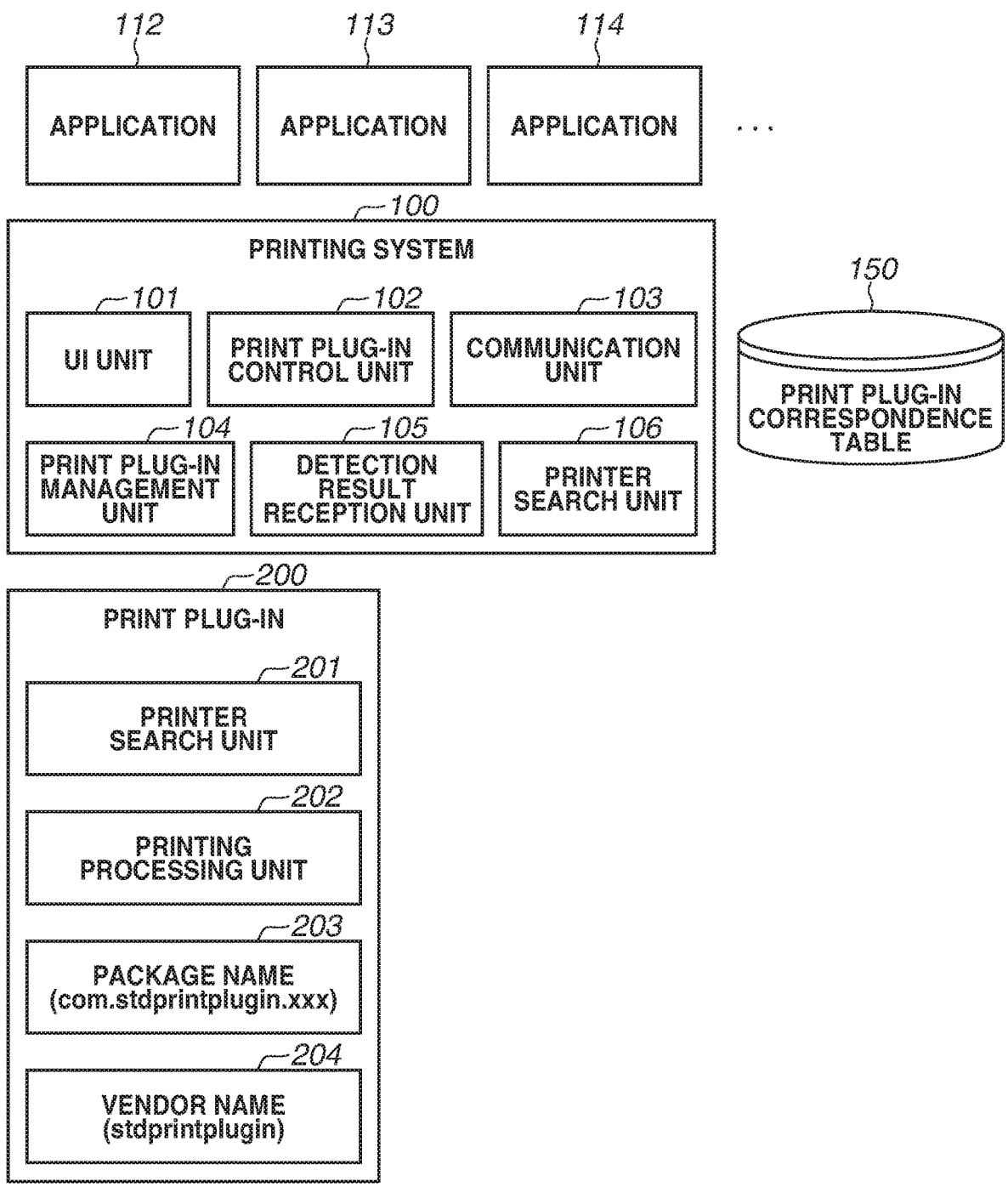

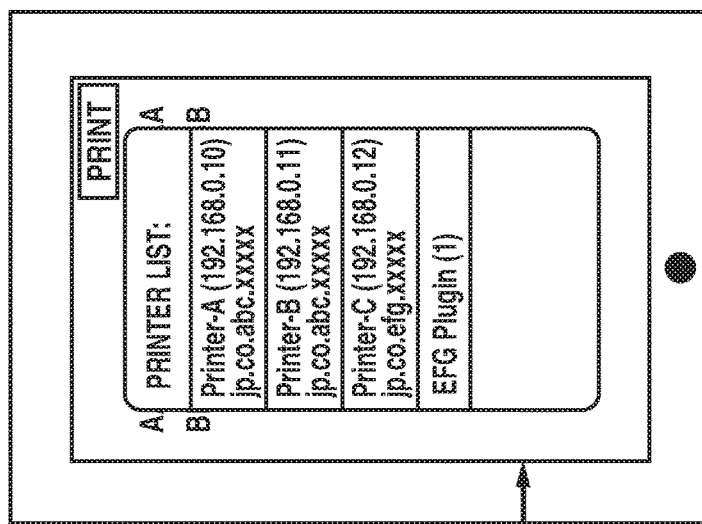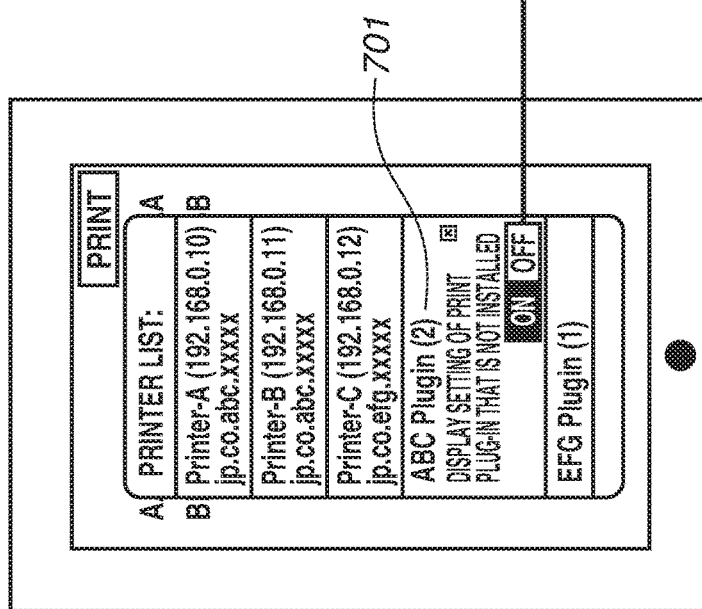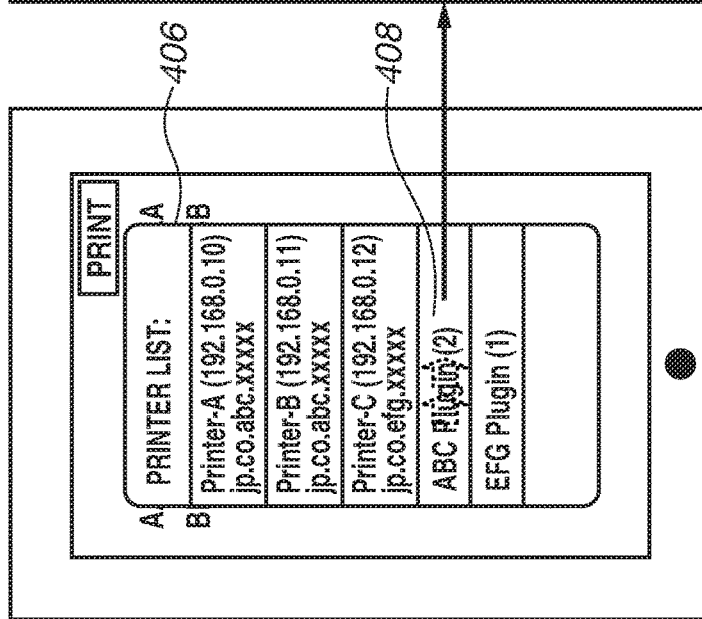

FIG.13

| VENDOR NAME | PACKAGE NAME | DOWNLOAD SITE |
|---|---|---|
| ABC | jp.co.abc.xxxxx | https://store.abc.printplugin |
| EFG | jp.co.efg.xxxxx | https://store.efg.printplugin |
| HIJ | com.hij.xxxxx | https://store.hij.printplugin |
| XYZ | com.xyz.xxxxx | https://store.xyz.printplugin |

INFORMATION PROCESSING APPARATUS, CONTROL METHOD, AND RECORDING MEDIUM

CROSS-REFERENCE TO RELATED APPLICATION

This application is a Continuation of U.S. application Ser. No. 15/438,609, filed Feb. 21, 2017 which claims priority from Japanese Patent Application No. 2016-036298, filed Feb. 26, 2016, which are hereby incorporated by reference herein in their entireties.

BACKGROUND OF THE INVENTION

Field of the Invention

The aspect of the embodiments relates to an information processing apparatus, control method, and recording medium.

Description of the Related Art

In recent years, a print function is increasingly supported as a standard function by an operating system (OS) for mobile terminals, such as Android (registered trademark), which runs on a mobile terminal apparatus such as a smartphone. In Windows (registered trademark) and other operating systems which run on a personal computer, the print function is controlled by software called a printer driver. In Android, the print function is controlled by software referred to as a print plug-in in place of the printer driver.

Japanese Patent Application Laid-Open No. 2006-190320 discusses a management system in which if a driver of a printer selected by a user is not installed on a client, the driver is distributed to the client and automatically installed onto the client.

The case where one printer is supported by a plurality of printer drivers is not considered in Japanese Patent Application Laid-Open No. 2006-190320.

SUMMARY OF THE INVENTION

According to an aspect of the embodiments, an information processing apparatus includes a search unit configured to instruct a plurality of print plug-ins having at least a printer search function to search for a printer, and a display unit configured to display, if the plurality of print plug-ins are instructed to perform the search, a first screen which includes (1) a printer detected by search processing performed by the plurality of print plug-ins instructed to perform the search and includes (2) an object for shifting to a second screen but does not include (3) a link to a download page of a print plug-in that is not installed, and to display, in response to an instruction given to the object in the first screen, the second screen which includes (3) the link to the download page of the print plug-in that is not installed.

Further features of the disclosure will become apparent from the following description of exemplary embodiments with reference to the attached drawings.

BRIEF DESCRIPTION OF THE DRAWINGS

FIG. 3 illustrates an example of a configuration of software which runs on a mobile terminal apparatus.

FIGS. 9A, 9B, and 9C illustrate an example of a display screen of an application according to the first exemplary embodiment.

FIG. 13 illustrates an example of a print plug-in correspondence table.

DESCRIPTION OF THE EMBODIMENTS

A print plug-in includes a printer (image forming apparatus) search function and a print function. The print plug-in presents to a user a list of printers detected by the search function in response to a request from an application, and transmits a print job to a selected printer. The print plug-in is provided in the form of an Android application and is provided from a printer vendor or application vendor to the user via an application distribution service such as Google Play (registered trademark).

To use the functions of the print plug-in, the user downloads and installs the print plug-in. On some mobile terminal apparatuses, the print plug-in is pre-installed to enable the user to use the print function without downloading and installing the print plug-in. On the other hand, the pre-installation of the print plug-in increases an amount of the storage used in the mobile terminal apparatus regardless of whether the user uses the print function.

The present specification discusses a method in which if one printer is supported by a plurality of print plug-ins, a selection candidate is displayed for each of the plurality of print plug-ins. In this method, even when a print plug-in is already installed, if there is a print plug-in that is not installed, the print plug-in that is not installed is also displayed as a selection candidate on a selection screen. Specifically, although printing in a printer is possible by an installed print plug-in, if there is another print plug-in that supports the printer and is not installed, a guide to cause a user to install another print plug-in is shown. This causes disturbance to the user and decreases operability.

The aspect of the embodiments is directed to providing an information processing apparatus showing improved operability in selecting and using an image forming apparatus.

Various exemplary embodiments of the disclosure will be described below with reference to the accompanying drawings.

Figure 1:
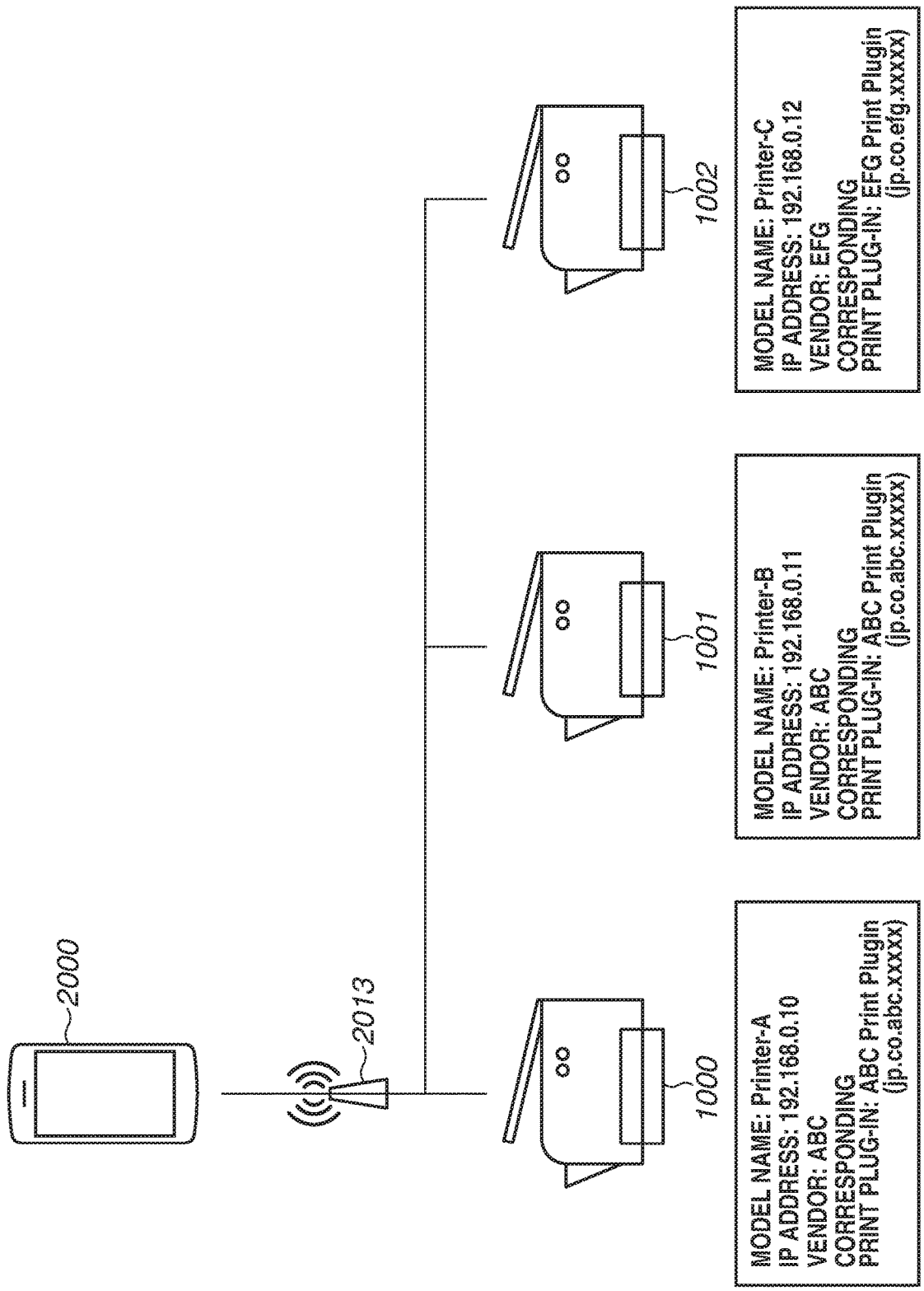
FIG. 1 illustrates a network configuration according to an exemplary embodiment of the disclosure.

FIG. 1 illustrates a network configuration according to a first exemplary embodiment of the disclosure.

A mobile terminal apparatus 2000 is an information processing apparatus and is connected via an access point 2013 to a network to which printers 1000, 1001, and 1002 are connected. As illustrated in FIG. 1, each of the printers 1000, 1001, and 1002 stores a model name and Internet Protocol (IP) address therein. While the printers are described as an example of an image processing apparatus in the present exemplary embodiment, the image processing apparatus is not limited to the printers. The image processing apparatus can be any other device which includes the print function, such as a multifunction peripheral (MFP).

Figure 2:
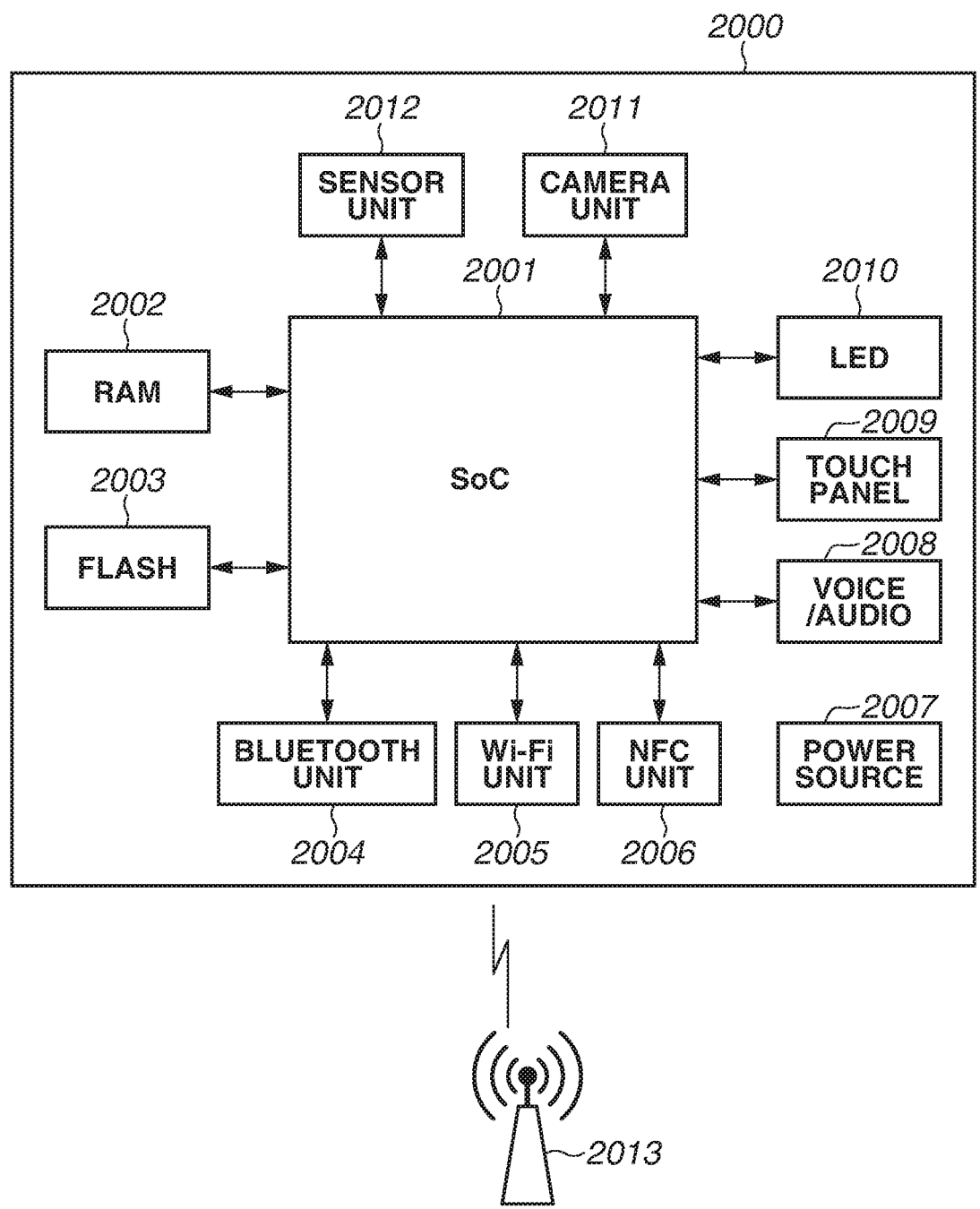
FIG. 2 illustrates an example of a hardware configuration of a mobile terminal apparatus.

FIG. 2 illustrates an example of the hardware configuration of the mobile terminal apparatus 2000.

A flash memory (Flash) 2003 stores various programs. A system-on-a-chip (SoC) 2001 executes a program as hardware, and the program stored on the flash memory 2003 performs control as software. The program is loaded into a random access memory (RAM) 2002, and the SoC 2001 interprets and executes the program.

A Bluetooth (registered trademark) unit 2004 performs Bluetooth (registered trademark) communication. A Wi-Fi unit 2005 performs wireless communication via the access point 2013. A near-field communication (NFC) unit 2006 performs near-field wireless communication. A power source 2007 supplies power to each component in the mobile terminal apparatus 2000. A voice/audio unit 2008 includes a microphone and speaker and is used to input and output voice/audio. A touch panel 2009 is an operation input unit that a user operates with his/her fingers. A light emitting diode (LED) unit 2010 is used for various displays.

A camera unit 2011 includes an image capturing unit configured to capture still images and moving images. A sensor unit 2012 includes Global Positioning System (GPS), acceleration sensor, geomagnetic sensor, and proximity sensor. The above-described components are connected to the SoC 2001, and the mobile terminal apparatus 2000 is connectable to the network via the access point 2013. While an operating system (OS) in the present exemplary embodiment is an Android OS (registered trademark) of Google (registered trademark) Inc., the OS is not limited to the Android OS.

FIG. 3 illustrates an example of a configuration of software which runs on the mobile terminal apparatus 2000.

Software programs in the present exemplary embodiment are stored on the flash memory 2003. Applications 112 to 114 are installed on the mobile terminal apparatus 2000 and provide a function to display contents such as images, documents, and web pages, and also a function to print, via a printing system 100.

The printing system 100 includes a user interface (UI) unit 101, a print plug-in control unit 102, a communication unit 103, a print plug-in management unit 104, a detection result reception unit 105, and a printer search unit 106. The UI unit 101 provides a UI of the printing system 100. The print plug-in control unit 102 controls the operation of a print plug-in (plug-in module) which is installed on the mobile terminal apparatus 2000. The communication unit 103 performs network communication with a printer using Wi-Fi.

The print plug-in management unit 104 manages information about a print plug-in which is installed on the mobile terminal apparatus 2000. The detection result reception unit 105 receives a notification of a detection result when the print plug-in detects a printer on the network. The printer search unit 106 is a printer search function which is pre-installed on the mobile terminal apparatus 2000, and searches for a printer on the network in response to a request from an application.

A print plug-in 200 includes a printer search function, a print job generation function, and a printer status acquisition function, and interfaces the printing system 100 with a printer (target printer) supported by the print plug-in 200. The print plug-in 200 can be installed and uninstalled as needed, and the print plug-in management unit 104 of the printing system 100 manages the installation state of each print plug-in. The print plug-in 200 includes a printer search unit 201, a printing processing unit 202, a package name 203, and a vendor name 204. To simplify the description, the print plug-in 200 which is pre-installed in the present exemplary embodiment is, but not limited to, a print plug-in that complies with standards supported by printers provided by a plurality of vendors.

A printer search unit 201 searches for a printer on the network using multicasting or broadcasting. A protocol such as Service Location Protocol (SLP) or Multicast Domain Name System (DNS) is used in the search. The protocol is not limited to SLP and DNS, and different protocols may be used for each print plug-in.

The printing processing unit 202 performs rendering processing on page description language (PDL) data or image data which is printable by the target printer. The package name 203 is a name which is assigned to the print plug-in 200 and by which the print plug-in 200 can uniquely be identified. In this example, the package name 203 is "com.stdprintpluguin.xxx". Different package names are assigned to each print plug-in, and each print plug-in stores the assigned package name in the package name 203. The vendor name 204 is the name of the vendor that provides the print plug-in 200. In this example, the vendor name 204 is "stdprintplugin".

A print plug-in correspondence table 150 is a table which contains information about a list of printers detected on the network by the printer search unit 106 and a list of print plug-ins corresponding to the detected printers.

FIG. 13 illustrates an example of the print plug-in correspondence table 150.

The print plug-in correspondence table 150 associates and stores the following information. Specifically, a vendor name 1101 acquired from a printer on the network by the printer search unit 106, a package name 1102 of a print plug-in, and a download site (universal resource locator (URL) information) 1103 of the print plug-in are associated and stored.

A printer detected on the network can be connected to a print plug-in by referring to the print plug-in correspondence table 150. If the print plug-in is not installed, it is possible to guide the user to a download site of the print plug-in. For example, table data 1104 indicates that a printer with the vendor name "ABC" corresponds to a print plug-in with the package name "jp.co.abc.xxxxx". Further, the table data 1104 also indicates that the printer with the vendor name "ABC" corresponds to the print plug-in of a download site URL "http:store.abc.printplugin".

FIGS. 4A, 4B, 5A, 5B, and 5C illustrate an example of a display screen of an application which implements the functions of the printing system 100.

Figure 4B:
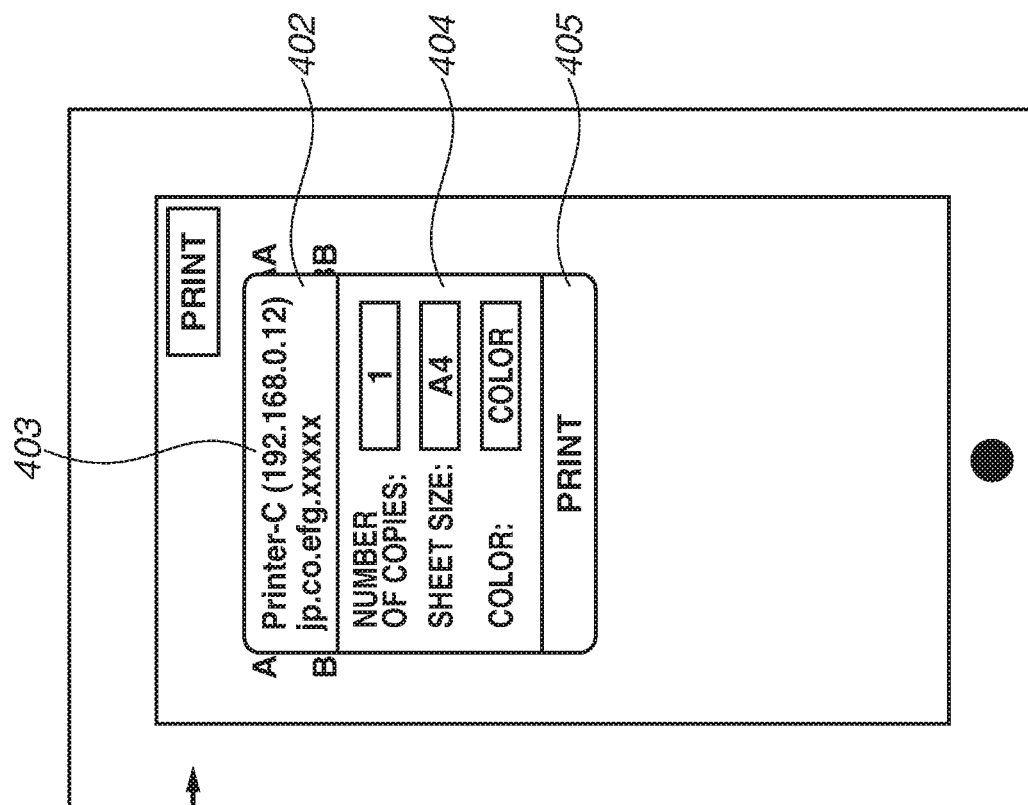
FIGS. 4A and 4B illustrate an example of a display screen of an application according to a first exemplary embodiment.
Figure 4A:
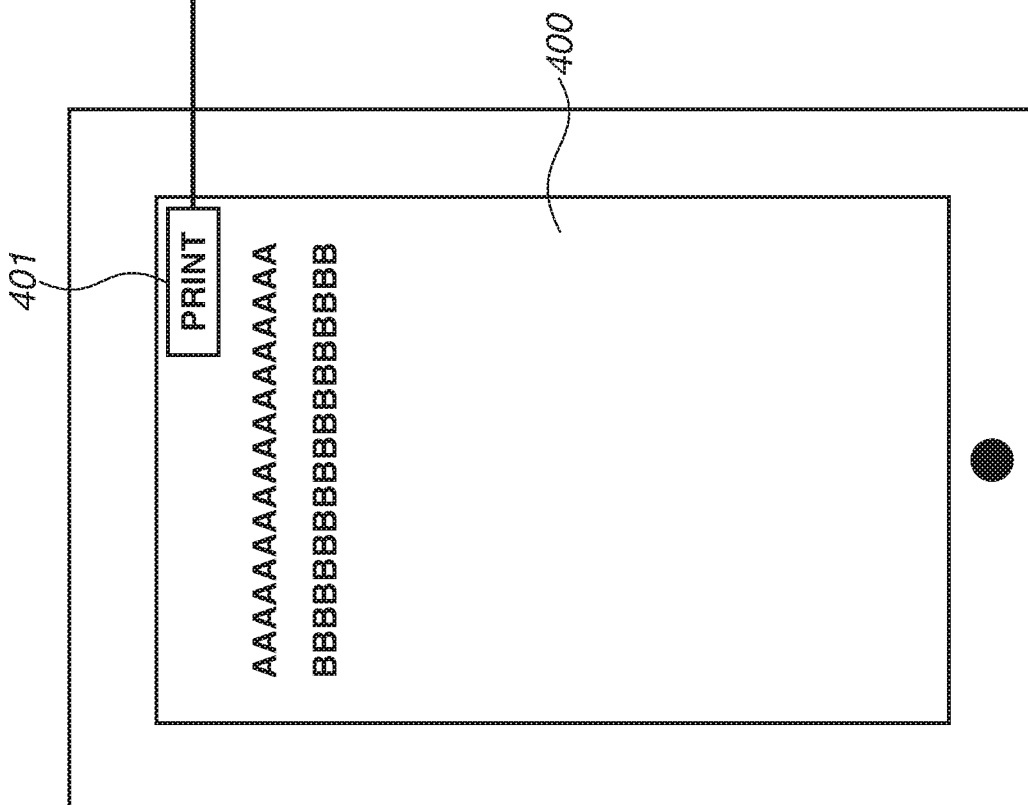

FIG. 4A illustrates an application screen 400 which displays the contents of a print target. If a user taps a print button 401, the UI unit 101 of the printing system 100 is called to shift to the screen illustrated in FIG. 4B.

FIG. 4B illustrates a print setting screen 402. The print setting screen 402 includes a target printer display region 403, a print setting region 404, and a print button 405. If a user sets desired printing settings on the print setting region 404 and then taps the print button 405, contents data of the application is output to a printer displayed in the target printer display region 403.

In FIG. 4B, the printer "Printer-C" with the IP address "192.168.0.12" is selected. In the present exemplary embodiment, a case will be described in which an output destination is changed to a different printer. In the case of changing the output destination to the different printer, if the user taps the target printer display region 403, the screen is changed to a screen illustrated in FIG. 5A. FIG. 5A illustrates a printer list screen 406 which displays a list of printers on the network. The contents displayed on the printer list screen 406 are controlled by the print plug-in control unit 102 and the UI unit 101. The following describes a process of controlling the display on the printer list screen 406.

Figure 6:
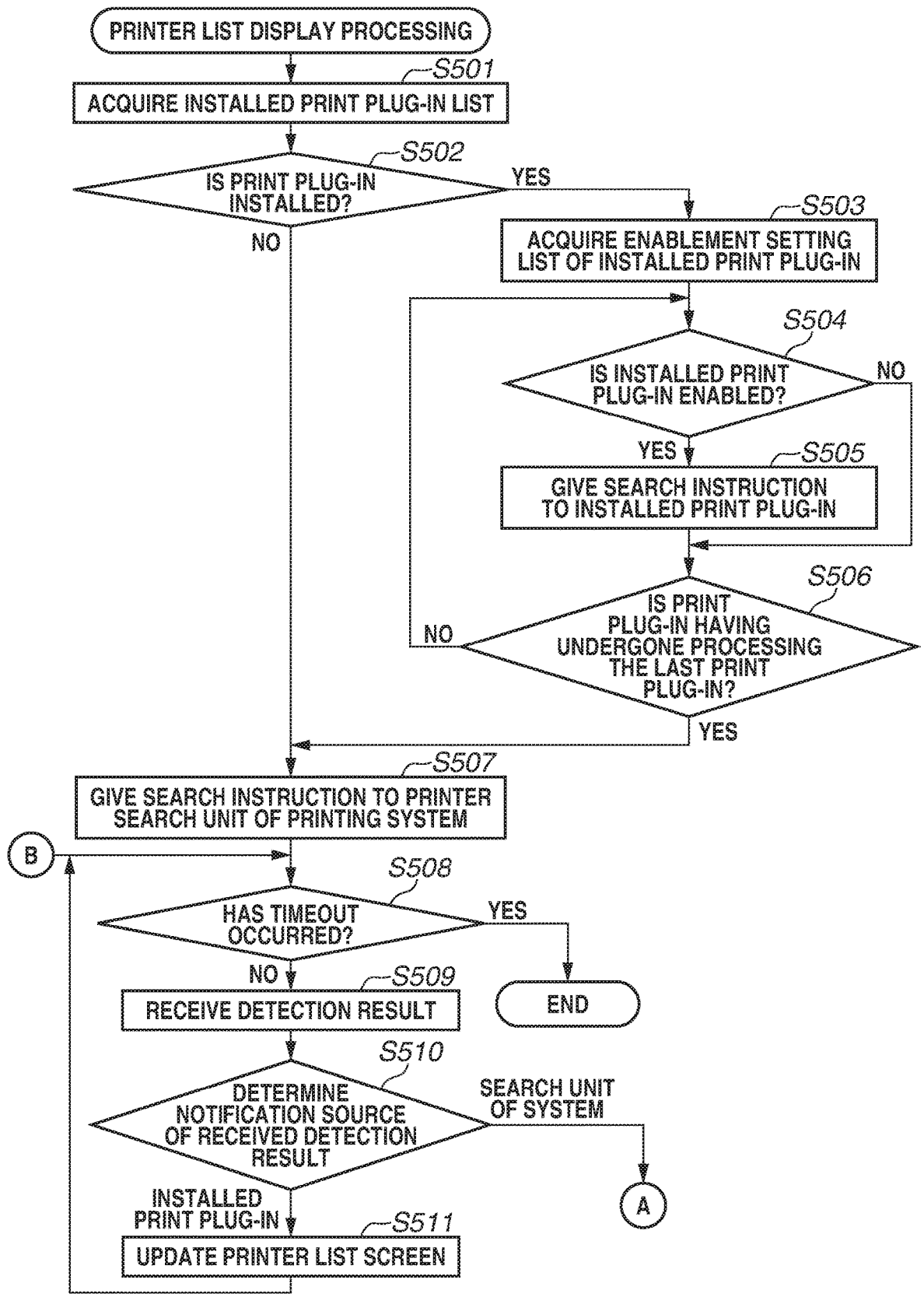
FIG. 6 illustrates the operation performed after a target printer display region is tapped.
Figure 7:
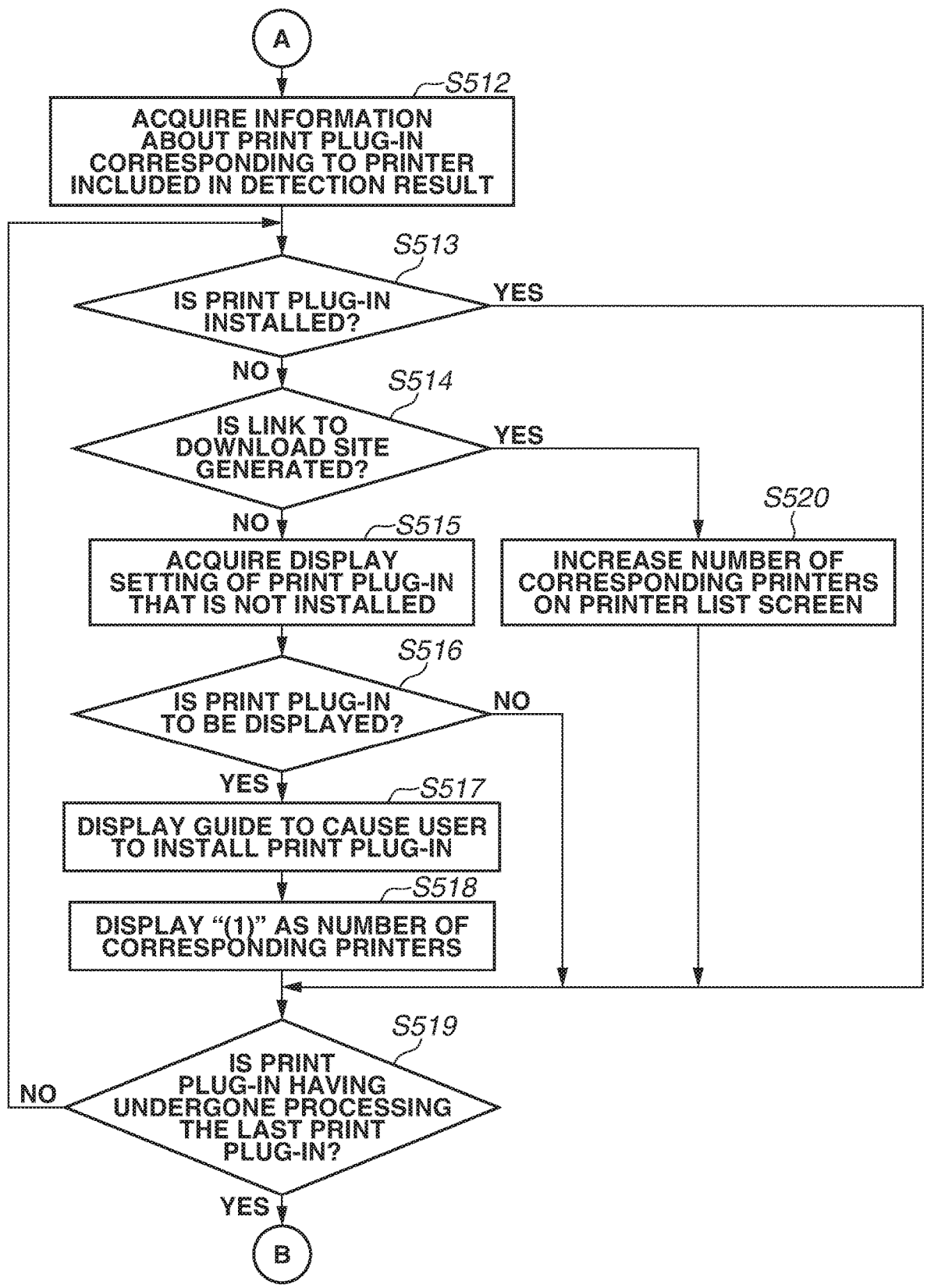
FIG. 7 illustrates the operation performed after a target printer display region is tapped.

FIGS. 6 and 7 are flow charts illustrating an example of the operation which the printing system 100 performs after the target printer display region 403 is tapped on the print setting screen 402 illustrated in FIG. 4B.

A program recorded on the flash memory 2003 is loaded into the RAM 2002 and executed by the SoC 2001 to realize the processes illustrated in FIGS. 6 and 7.

If the target printer display region 403 is tapped on the print setting screen 402, then in step S501, the print plug-in control unit 102 acquires via the print plug-in management unit 104 a list of print plug-ins installed on the mobile terminal apparatus 2000. In step S502, the print plug-in control unit 102 determines whether there is a print plug-in 200 installed via the print plug-in management unit 104.

In step S502, if the print plug-in control unit 102 determines that there is an installed print plug-in 200 (YES in step S502), the processing proceeds to step S503. In step S503, the print plug-in control unit 102 acquires an enablement setting list which indicates whether the installed print plug-in is enabled or disabled. Settings relating to the print plug-in display control including an enablement setting are set on an enablement setting screen.

Figure 8B:
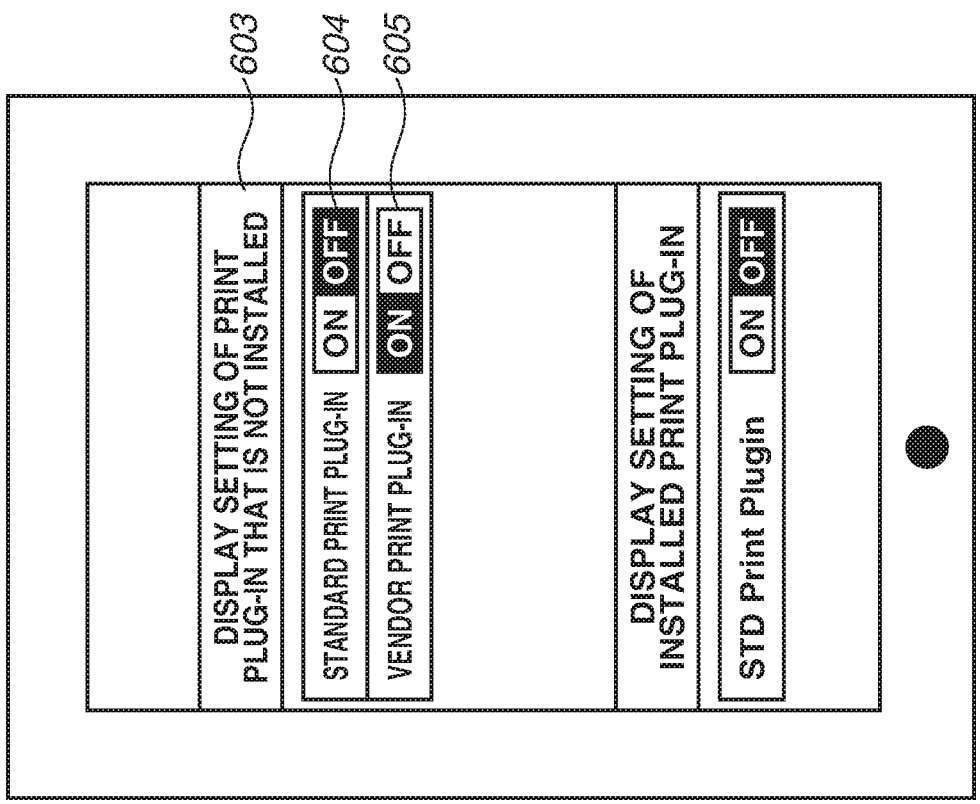
FIGS. 8A and 8B illustrate an example of a display screen of an application according to the first exemplary embodiment.
Figure 8A:
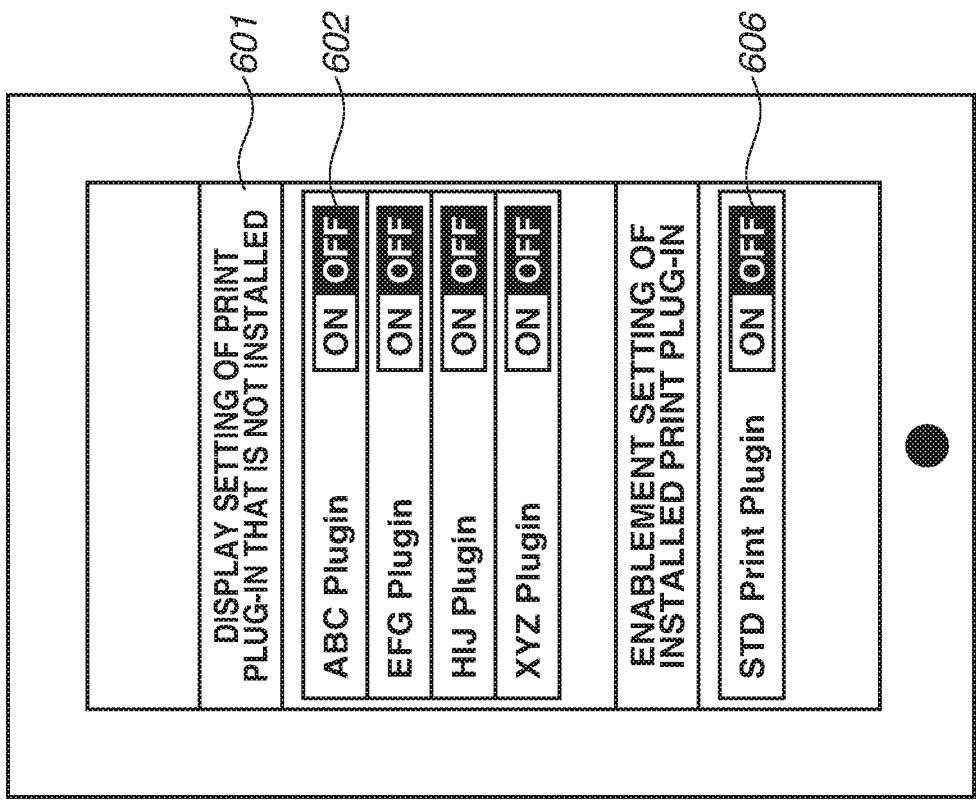

FIGS. 8A and 8B illustrate an example of the enablement setting screen.

The enablement setting screen is managed by the print plug-in management unit 104. On the enablement setting screen, a display setting of a print plug-in that is not installed and an enablement setting of an installed print plug-in can be made.

In the present exemplary embodiment, whether to enable or disable an installed print plug-in can be selected for each installed print plug-in in an enablement setting 606, as illustrated in FIG. 8A. In the example illustrated in FIG. 8A, "STD Print Plugin" is enabled. Only when the setting is enabled, the print plug-in control unit 102 instructs the print plug-in to search for a printer in step S505 described below.

In step S503, the print plug-in control unit 102 acquires the enablement setting list of the installed print plug-in illustrated in FIG. 8A, and the processing proceeds to step S504. In step S504, based on the enablement setting of the first installed print plug-in which is acquired in step S503, the print plug-in control unit 102 determines whether the installed print plug-in is enabled or disabled.

In step S504, if the print plug-in control unit 102 determines that the installed print plug-in is enabled (YES in step S504), the processing proceeds to step S505. In step S505, the print plug-in control unit 102 gives the installed print plug-in an instruction to search for a target printer. On the other hand, in step S504, if the print plug-in control unit 102 determines that the installed print plug-in is not enabled (NO in step S504), no search for a target printer is performed, and the processing proceeds to step S506.

In step S506, the print plug-in control unit 102 determines whether the print plug-in having undergone steps S504 and S505 is the last installed print plug-in on the enablement setting list acquired in step S503. In step S506, if the print plug-in control unit 102 determines that the print plug-in having undergone steps S504 and S505 is not the last installed print plug-in on the enablement setting list (NO in step S506), the processing returns to step S504. Then, steps S504 to S506 are repeated on the next installed print plug-in on the enablement setting list. On the other hand, in step S506, if the print plug-in control unit 102 determines that the print plug-in having undergone steps S504 and S505 is the last installed print plug-in on the enablement setting list (YES in step S506), the processing proceeds to step S507.

In step S507, the print plug-in control unit 102 gives a search instruction to the printer search unit 106 of the printing system 100. In step S508, the print plug-in control unit 102 determines whether timeout has occurred. In step S508, if the print plug-in control unit 102 determines that the timeout has not occurred (NO in step S508), the processing proceeds to step S509. In step S509, the detection result reception unit 105 of the printing system 100 receives a detection result of the search processing executed in step S505 and in step S507.

In step S510, the print plug-in control unit 102 determines a notification source of the detection result received in step S509. If the print plug-in control unit 102 determines that the detection result is received from the printer search unit 201 of the print plug-in 200 which is given the instruction in step S505 (YES in step S510), the processing proceeds to step S511. On the other hand, if the print plug-in control unit 102 determines that the detection result is received from the printer search unit 106 of the printing system 100 which is given the instruction in step S507 (NO in step S510), the processing proceeds to step S512 in FIG. 7.

In step S511, the UI unit 101 of the printing system 100 updates the printer list screen 406 as illustrated in FIG. 5A based on the information of the detection result received from the print plug-in 200. Specifically, information about a printer supported by the installed print plug-in 200 is added as indicated by printer information 407 on the printer list screen 406. Then, the processing returns to step S508, and steps S508 to S511 are repeated until the timeout occurs.

On the other hand, in step S512, the print plug-in control unit 102 refers to the print plug-in correspondence table 150 and acquires information about the print plug-in corresponding to the printer included in the detection result received in step S509. At this time, the print plug-in control unit 102 acquires the information about the print plug-in corresponding to the vendor name of the printer detected by the printer search unit 106 based on the information about the vendor name acquired from the detected printer.

Further, if the detection result received in step S509 is a response set by standards such as Mopria (registered trademark), the print plug-in control unit 102 determines that the printer corresponds to a standard print plug-in. If the printer corresponds to both the standard print plug-in and the print plug-in (vendor plug-in) provided by the vendor, information about the plurality of print plug-ins (information list) is acquired in step S512.

In step S513, the print plug-in management unit 104 determines whether the first print plug-in in the print plug-in information list acquired in step S512 is already installed. If the print plug-in management unit 104 determines that the first print plug-in is already installed (YES in step S513), the processing proceeds to step S519. On the other hand, if the print plug-in management unit 104 determines that the first print plug-in is not installed (NO in step S513), the processing proceeds to step S514.

In step S514, the print plug-in control unit 102 determines whether a link to a download site of the print plug-in corresponding to the print plug-in information acquired in step S512 is generated on the printer list screen 406. If the print plug-in control unit 102 determines that no link to the download site is generated (NO in step S514), then in step S515, the print plug-in management unit 104 acquires the display setting of the print plug-in. The display setting of the print plug-in is set on the enablement setting screen described above with reference to FIGS. 8A and 8B.

In the present exemplary embodiment, as illustrated in FIG. 8A, whether a print plug-in that is not installed is to be displayed on the printer list screen 406 can be determined via a display setting 601 for each print plug-in that is not installed. In other words, for each print plug-in that is not installed, whether to display a guide to cause the user to install the print plug-in (whether to generate a link to the download site) is selectable. In the example illustrated in FIG. 8A, "ABC Plugin" which is a print plug-in that is not installed is set to be displayed on the printer list screen 406 via a display setting 602.

Further, FIG. 8B illustrates another example of the enablement setting screen for making the display setting according to the present exemplary embodiment. In FIG. 8A, whether to display a print plug-in can be set for each print plug-in that is not installed. On the other hand, in FIG. 8B, whether to display a standard print plug-in on the printer list screen can be set via a display setting 604, and whether to display a vendor-provided print plug-in(s) other than the standard print plug-in on the printer list screen can be set via a display setting 605.

In other words, in FIG. 8B, whether to display the vendor plug-ins can be set not for each vendor plug-in but by a single operation. In this way, for example, in a case where a plurality of vendor-provided print plug-ins is not installed while a standard print plug-in is installed, all the vendor plug-ins can be set to be not displayed, by a simple operation. In addition, in FIG. 8B, for example, in the case where the standard print plug-in is installed, the display setting 604 may be grayed out.

As described above, by using the setting screen as illustrated in FIG. 8A or 8B, the user can designate a condition for displaying a guide to cause the user to install the print plug-in on a printer selection screen. While the condition for displaying or not displaying the guide is set using the setting screen in the present exemplary embodiment, the embodiment is not limited thereto. For example, instead of prompting the user to set the condition, the printing system can set a condition. For example, if a printer is available for printing because a print plug-in is already installed, no guide to cause the user to install another print plug-in corresponding to the printer is displayed. This case will be described below in a second exemplary embodiment.

However, in the present exemplary embodiment, as illustrated in FIGS. 8A and 8B, the method is used in which the user makes the setting as to when to display or not to display a print plug-in or the guide. In this way, the user can add a print plug-in with ease. For example, a Mopria printer can in general make print using a print plug-in provided by a printer vendor in addition to a print plug-in provided by Mopria (hereinafter, "Mopria plug-in"). Mopria is a standard that enable printing from a mobile terminal apparatus to various printers provided by various vendors.

In a case where only a standard print plug-in such as the Mopria plug-in is installed, printing is possible in a printer which supports the standard, but the standard print plug-in supports in many cases only some functions that are common to printers. Thus, a specific function of the printer cannot be used.

A user who desires to use the specific function of the printer might consider installing the print plug-in which is provided by the printer vendor and supports various functions after the Mopria plug-in enables the printer to make prints. In such a case, if no guide to cause the user to install the print plug-in is displayed, the user cannot add the print plug-in with ease. This impairs the user convenience.

As in the present exemplary embodiment, the inclusion of the setting method illustrated in FIG. 8A or 8B enables the user to add a print plug-in with ease. The following describes a case in which the display settings of print plug-ins that are not installed are individually set on the screen illustrated in FIG. 8A.

In step S516, the print plug-in control unit 102 determines whether the print plug-in is to be displayed, based on the display setting acquired in step S515. In step S516, if the print plug-in control unit 102 determines that the print plug-in is to be displayed (YES in step S516), the processing proceeds to step S517. On the other hand, if the print plug-in control unit 102 determines that the print plug-in is not to be displayed (NO in step S516), steps S517 and S518 are skipped, and the processing proceeds to step S519.

In step S517, the UI unit 101 displays a guide on the printer list screen 406 to cause the user to install the print plug-in. In the present exemplary embodiment, as illustrated in FIG. 5A, the link to the download site of the print plug-in is added as the guide to cause the user to install the print plug-in on the printer list screen 406.

FIG. 5A illustrates a case in which the display settings acquired in step S515 are made to display all the print plug-ins that are not installed (all the display settings in FIG. 8A are set to "ON"). Further, FIG. 5B illustrates a case in which the display settings acquired in step S515 are made not to display any print plug-ins that are not installed (all the display settings in FIG. 8A are set to "OFF"). Specifically, no link to the download sites of the print plug-ins that are not installed is displayed on the printer list screen 406.

Figure 5C:
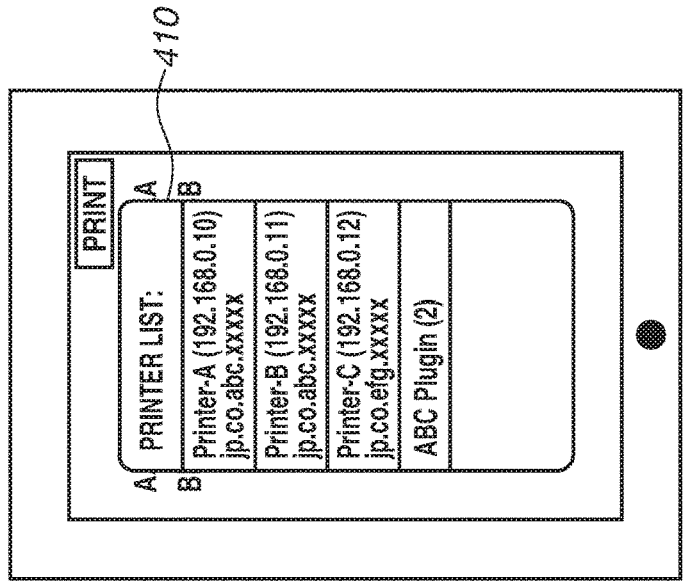
FIGS. 5A, 5B, and 5C illustrate an example of a display screen of an application according to the first exemplary embodiment.
Figure 5B:
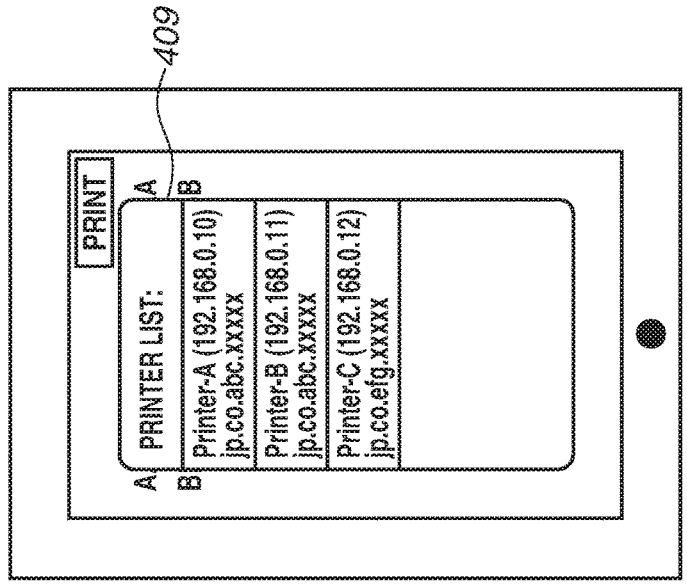
Figure 5A:
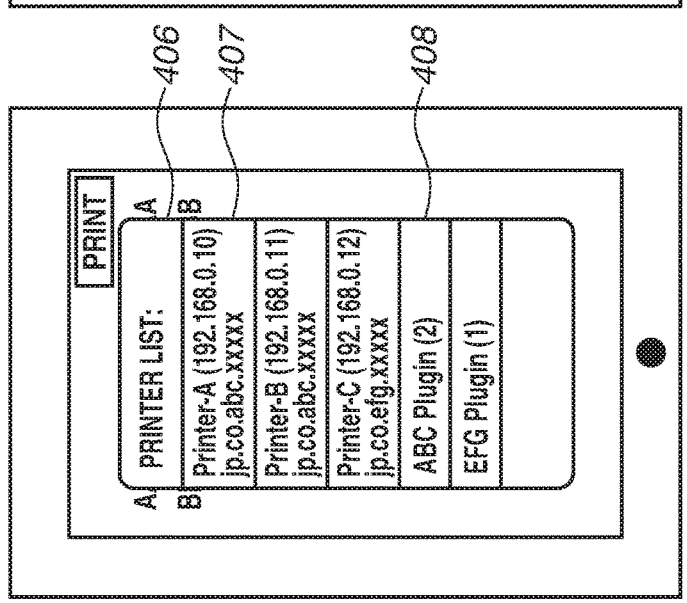

Further, FIG. 5C illustrates a case in which the display settings acquired in step S515 are made to display only "ABC Plugin" (in FIG. 8A, only the display setting of "ABC Plugin" is set to "ON", and the display settings of the other print plug-ins are set to "OFF"). When FIGS. 5A and 5C are compared, it can be seen that no link to the download site of "EFG Plugin" is displayed on the printer list screen 406 in FIG. 5C. In step S518, the UI unit 101 displays "(1)" next to the name of the print plug-in displayed in the display region of printer information 408 in step S517, as the number of printers corresponding to the print plug-in.

On the other hand, in step S514, if the print plug-in control unit 102 determines that the link to the download site is generated (YES in step S514), the processing proceeds to step S520. In step S520, the UI unit 101 increases by one the number of printers corresponding to the print plug-in that is displayed in the display region of the printer information 408 on the printer list screen 406, and updates the display. In step S519, the print plug-in control unit 102 determines whether the print plug-in having undergone steps S513 to S518 and S520 is the last print plug-in on the information list acquired in step S512.

In step S519, if the print plug-in control unit 102 determines that the print plug-in having undergone steps S513 to S518 and S520 is not the last print plug-in on the information list (NO in step S519), the processing returns to step S513. Then, steps S513 to S518 and S520 are repeated on the next print plug-in of the information list. On the other hand, in step S519, if the print plug-in control unit 102 determines that the print plug-in having undergone steps S513 to S518 and S520 is the last print plug-in of the information list (YES in step S519), the processing returns to step S508. Then, in step S508, the print plug-in control unit 102 determines whether timeout has occurred. If the print plug-in control unit 102 determines that the timeout has occurred (YES in step S508), the processes illustrated in FIGS. 6 and 7 are ended.

FIGS. 9A to 9C illustrate another example of the screen for setting the display settings of print plug-ins that are not installed.

In this example, a UI for making the display settings is displayed in response to a swipe at the display region of the printer information 408 on the printer list screen 406 in FIG. 9A. Specifically, the UI unit 101 displays a setting region 701 as illustrated in FIG. 9B. The setting region 701 is a UI via which the display settings of print plug-ins that are not installed can be changed. In the setting region 701, whether to display a print plug-in is selectable for each print plug-in.

For example, if the display setting of "ABC Plugin" is changed to "OFF" in the setting region 701, the screen is changed to a screen illustrated in FIG. 9C, and "ABC Plugin" which is set not to be displayed is not displayed in the printer list screen 406. While the example in which the setting region 701 is displayed in response to a swipe operation on the printer information 408 is described in the present exemplary embodiment, the operation is not limited to the swipe operation, and the setting region 701 can be displayed in response to a different operation such as a flick operation.

As described above, according to the present exemplary embodiment, in the case where a plurality of print plug-ins corresponds to one printer and one or more of the print plug-ins are already installed, whether to display the guide to cause the user to install another print plug-in can be set. Specifically, the user is not prompted to install another print plug-in for a printer which is ready for printing. Thus, the operability is improved. Further, when the user desires to use another print plug-in for the printer that is ready for printing, the user can add the other print plug-in with ease. Thus, the convenience is not impaired.

The following describes a second exemplary embodiment. In the first exemplary embodiment, the contents to be displayed on the printer list screen 406 are controlled according to the display/non-display settings made by a user on the enablement setting screen (FIGS. 8A and 8B). In the present exemplary embodiment, the method will be described in which whether to display on the printer list screen 406 a print plug-in that is not installed is controlled without prompting the user to make the settings. The network configuration and the hardware and software configurations of the mobile terminal apparatus 2000 according to the present exemplary embodiment are similar to those according to the first exemplary embodiment. Thus, in the following description, components that are similar to those according to the first exemplary embodiment are given the same reference numerals, and description thereof is omitted.

Figure 10A:
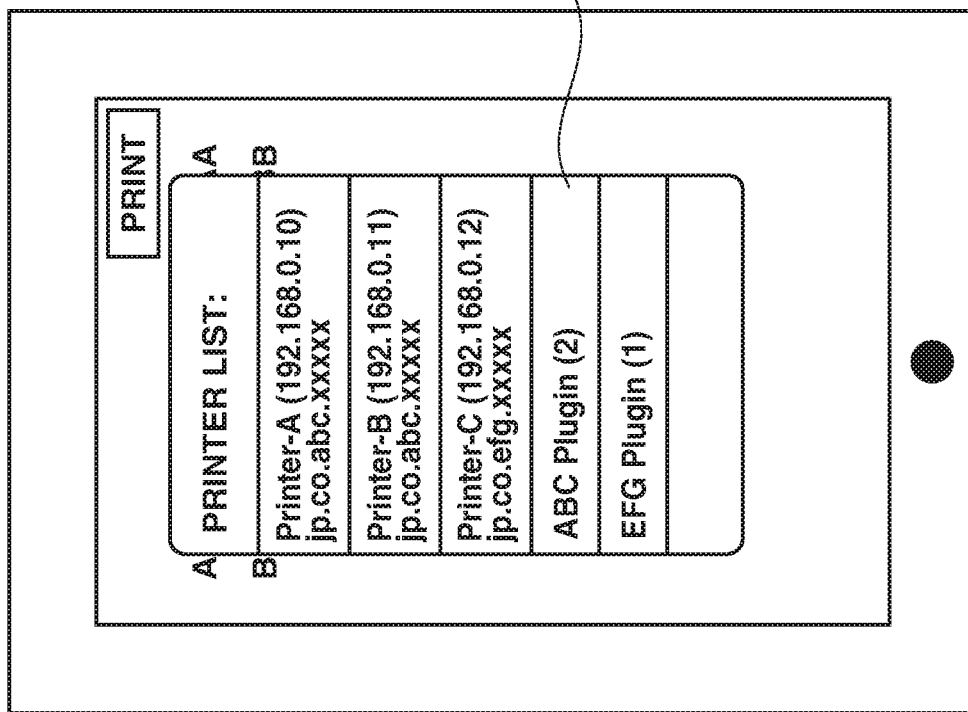
FIGS. 10A and 10B illustrate an example of a display screen of an application according to a second exemplary embodiment.
Figure 10B:
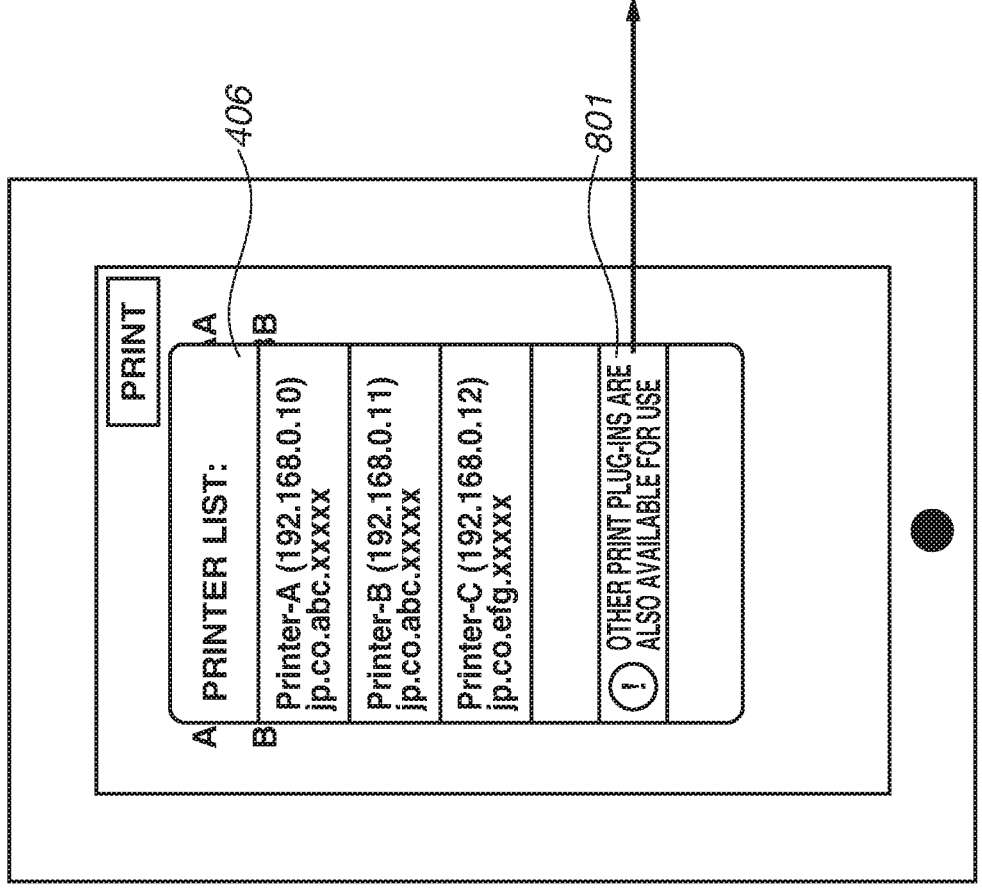

FIGS. 10A and 10B illustrate an example of a display screen of an application on which the functions of the printing system 100 according to the present exemplary embodiment are installed. Further, FIGS. 11 and 12 are flow charts illustrating an example of the operation of the printing system 100 which is performed after the target printer display region 403 is tapped on the print setting screen 402 illustrated in FIG. 4B.

Figure 11:
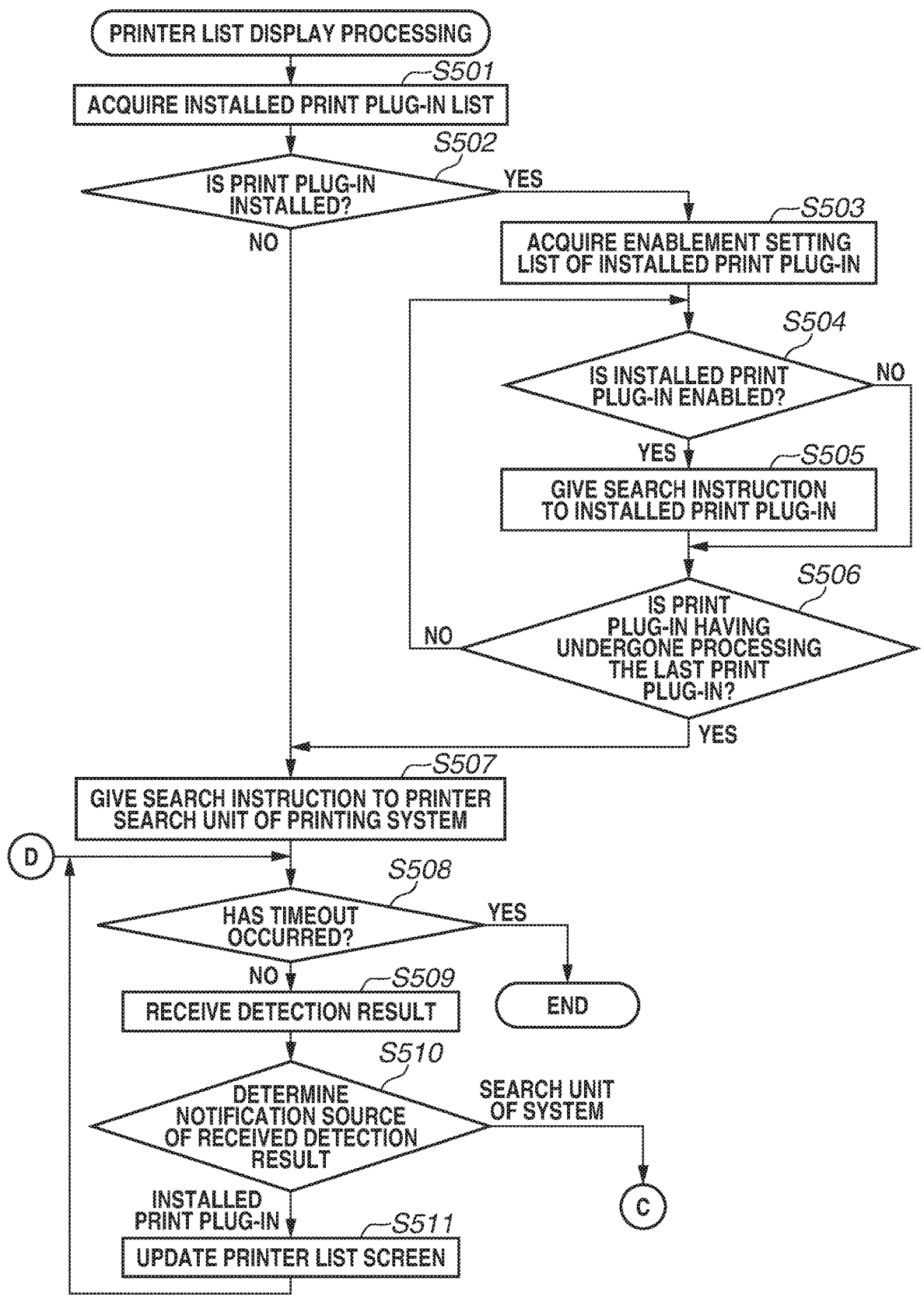
FIG. 11 illustrates the operation performed after a target printer display region is tapped.
Figure 12:
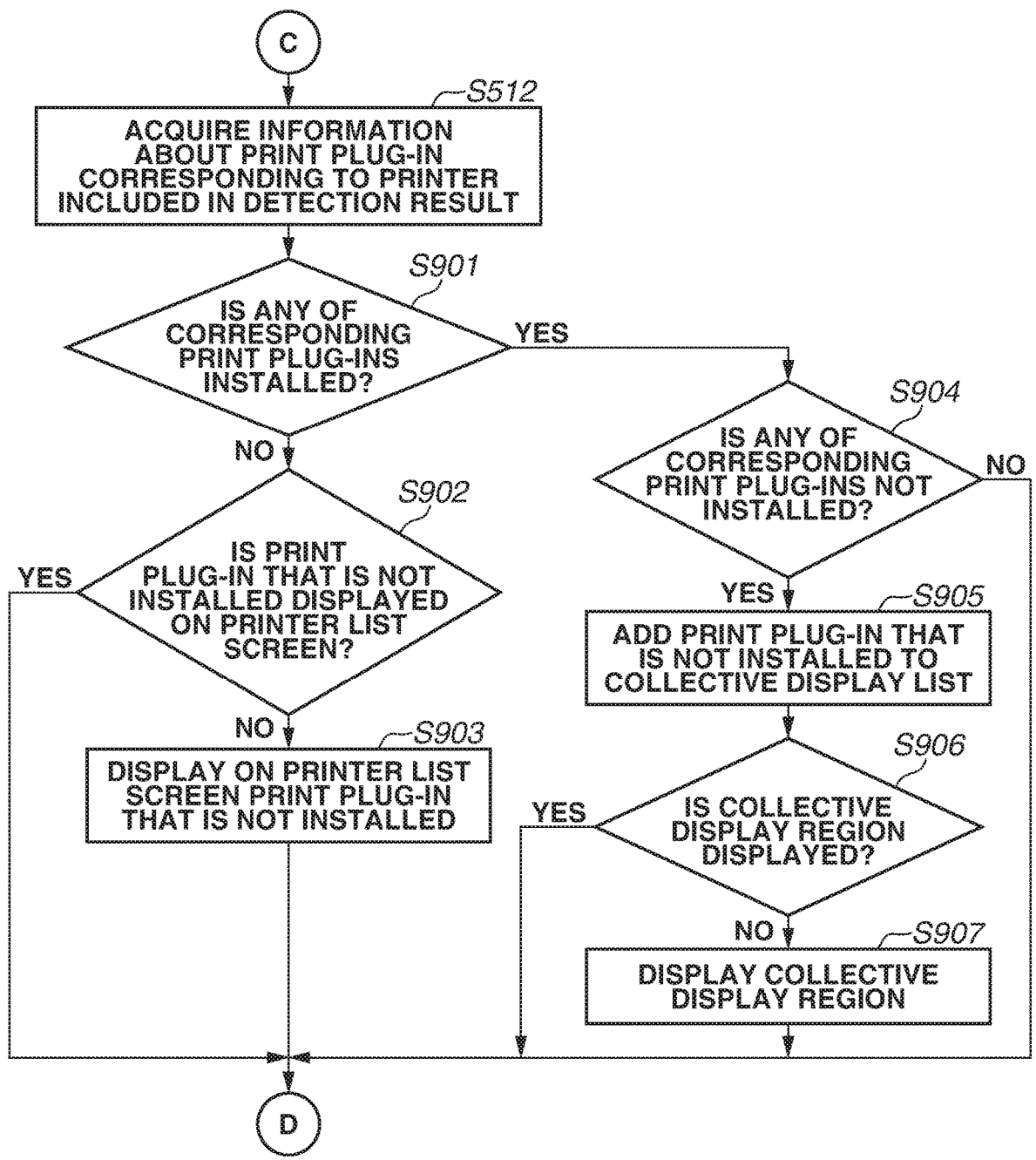
FIG. 12 illustrates the operation performed after a target printer display region is tapped.

The processes illustrated in FIGS. 11 and 12 correspond to the processes illustrated in FIGS. 6 and 7 according to the first exemplary embodiment. Steps similar to the above-described steps are given the same reference numerals, and description thereof is omitted. The program recorded on the flash memory 2003 is loaded into the RAM 2002 and executed by the SoC 2001 to realize the processes illustrated in FIGS. 11 and 12.

In step S901 in FIG. 12, the print plug-in control unit 102 determines whether any one of the print plug-in(s) included in the information list acquired in step S512 is installed. In step S901, if the print plug-in control unit 102 determines that none of the print plug-in(s) included in the information list is installed (NO in step S901), the processing proceeds to step S902. In step S902, the print plug-in control unit 102 determines whether the print plug-in(s) included in the information list that is not installed is displayed on the printer list screen 406.

In step S902, if the print plug-in control unit 102 determines that the print plug-in(s) that is not installed is displayed (YES in step S902), the processing returns to step S508, and step S508 and the subsequent steps are repeated on the next printer until the timeout occurs. On the other hand, in step S902, if the print plug-in control unit 102 determines that the print plug-in(s) that is not installed is not displayed (NO in step S902), the processing proceeds to step S903. In step S903, the UI unit 101 displays on the printer list screen 406 the print plug-in(s) that is not installed. Specifically, a link to the download site of the print plug-in(s) is generated on the printer list screen 406.

In step S902, if there is a plurality of print plug-ins that is not installed, then in step S903, at least one of the print plug-ins that are not installed can be displayed, but the embodiment is not limited thereto. For example, in step S903, all the print plug-ins that are not installed may be displayed.

On the other hand, in step S901, if the print plug-in control unit 102 determines that one or more of the print plug-ins included in the information list are installed (YES in step S901), the processing proceeds to step S904. In step S904, the print plug-in management unit 104 determines whether any of the print plug-in(s) included in the information list acquired in step S512 is not installed.

In step S904, if the print plug-in management unit 104 determines that the information list acquired in step S512 does not include any print plug-in that is not installed (NO in step S904), the processing returns to step S508, and step S508 and the subsequent steps are repeated on the next printer until the timeout occurs. On the other hand, in step S904, if the print plug-in management unit 104 determines that one or more of the print plug-in(s) included in the information list acquired in step S512 are not installed (YES in step S904), the processing proceeds to step S905. In step S905, the UI unit 101 adds the relevant plug-in to a list (collective display list) that collectively displays the print plug-in(s) that is not installed.

FIG. 10A illustrates an example of the collective display. The collective display is a display that indicates that one or more of print plug-in(s) available for use in a printer corresponding to an already-installed print plug-in are not installed. In the example illustrated in FIG. 10A, the display "other print plug-ins are also available for use" is presented in a collective display region 801.

If the collective display region 801 is tapped, the screen is changed to a screen as illustrated in FIG. 10B, and the UI unit 101 displays a guide to cause the user to install the print plug-in that is not installed. Specifically, a link to the download site of the print plug-in that is not installed is displayed on the printer list screen 406. The displayed print plug-in that is not installed is the print plug-in added to the collective display list in step S905.

In step S906, the UI unit 101 determines whether the collective display is presented on the printer list screen 406 as illustrated in FIG. 10A. Specifically, in the case described in the present exemplary embodiment, whether the collective display region 801 is displayed is determined. In step S906, if the UI unit 101 determines that the collective display region 801 is already displayed (YES in step S906), the processing returns to step S508, and step S508 and the subsequent steps are repeated until the timeout occurs.

On the other hand, if the UI unit 101 determines that the collective display region 801 is not displayed (NO in step S906), the processing proceeds to step S907. In step S907, the UI unit 101 presents the collective display as illustrated in FIG. 10A. In this example, the screen is updated such that the collective display region 801 is displayed on the printer list screen 406. Then, the processing returns to step S508, and if it is determined that the timeout has occurred, the processes illustrated in FIGS. 11 and 12 are ended.

In the present exemplary embodiment, in the case where it is determined in step S901 that one or more of the corresponding print plug-ins are installed, the other corresponding print plug-ins that are not installed are collectively displayed. The present exemplary embodiment is not limited to the foregoing. For example, a print plug-in that is not installed can be not displayed.

OTHER EXEMPLARY EMBODIMENT

The above-described exemplary embodiments can also be realized by supplying a program which realizes one or more functions of the above-described exemplary embodiments to a system or apparatus via a network or storage medium and then causing one or more processors in a computer of the system or apparatus to execute the program. Further, the above-described exemplary embodiments can also be realized by a circuit (e.g., application specific integrated circuit (ASIC)) which realizes the one or more functions.

While the disclosure has been described with reference to exemplary embodiments, it is to be understood that the disclosure is not limited to the disclosed exemplary embodiments, and various modifications and changes can be made without departing from the spirit of the disclosure.

In an information processing apparatus according to an exemplary embodiment of the disclosure, the operability can be improved in selecting and using an image forming apparatus.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
    at least one memory that stores a set of instructions; and
    at least one processor that executes the instructions, the instructions, when executed, causing the information processing apparatus to perform operations comprising:
    instructing an installed print plug-in including a printer search function to search for a printer;
    displaying a first screen including information of printers detected by the instructed print plug-in and a predetermined object for displaying a second screen; and
    displaying, based on receiving an instruction from a user for selecting the predetermined object, the second screen including information of print plug-ins that have not been installed, wherein the print plug-ins include printer search functions.

2. The information processing apparatus according to claim 1, further comprising:
    the at least one memory storing information indicating whether each of a plurality of print plug-ins is in an enabled state or a disabled state,
    wherein each of the plurality of print plug-ins in the enabled state is instructed to search for a printer.

3. The information processing apparatus according to claim 1, wherein the operations include instructing to search for a printer.

4. The information processing apparatus according to claim 1, wherein in a case where a plurality of print plug-ins on a network has not been installed, the information on the second screen includes at least a plurality of display items each for displaying a download site of a corresponding one of the plurality of print plug-ins that have not been installed.

5. The information processing apparatus according to claim 1, wherein each of the print plug-ins has a printer function to search for a printer.

6. The method for an information processing apparatus according to claim 1, wherein the first screen does not include vendor names of the print plug-ins that have not been installed.

7. The information processing apparatus according to claim 1, wherein the information of the print plug-ins that have not been installed includes vendor names of the print plug-ins that have not been installed.

8. The information processing apparatus according to claim 1, wherein the information of the print plug-ins that have not been installed includes vendor names of printers that correspond to the print plug-ins that have not been installed.

9. The information processing apparatus according to claim 1, wherein the first screen does not include the information of the print plug-ins that have not been installed.

10. The information processing apparatus according to claim 1, wherein the first screen is displayed in a case where the instructed print plug-in has detected the printers.

11. The information processing apparatus according to claim 1, wherein the second screen is displayed in a case where the print plug-ins have been identified as print plug-ins that are corresponding to printers on a network and that have not been installed.

12. The information processing apparatus according to claim 6, wherein the information of the print plug-ins that have not been installed includes vendor names of the print plug-ins that have not been installed.

13. A method for an information processing apparatus comprising:
    instructing an installed print plug-in including a printer search function to search for a printer;
    displaying a first screen including information of printers detected by the instructed print plug-in and a predetermined object for displaying a second screen; and
    displaying, based on receiving an instruction from a user for selecting the predetermined object, the second screen including information of print plug-ins that have not been installed, wherein the print plug-in include printer search functions.

14. The method according to claim 13, further comprising:
    storing information indicating whether each of a plurality of print plug-ins is in an enabled state or a disabled state,
    wherein each of the plurality of print plug-ins in the enabled state is instructed to search for a printer.

15. The method according to claim 13, further comprising instructing to search for a printer.

16. The method according to claim 13, wherein in a case where a plurality of print plug-ins on a network has not been installed, the information on the second screen includes at least a plurality of display items each for displaying a download site of a corresponding one of the plurality of print plug-ins that have not been installed.

17. The method according to claim 13, wherein each of the print plug-ins has a printer function to search for a printer.

18. The method according to claim 13, wherein the information of the print plug-ins that have not been installed includes vendor names of the print plug-ins that have not been installed.

19. The method according to claim 13, wherein the information of the print plug-ins that have not been installed includes vendor names of printers that correspond to the print plug-ins that have not been installed.

20. The method according to claim 13, wherein the first screen does not include the information of the print plug-ins that have not been installed.

21. The method according to claim 13, wherein the first screen does not include vendor names of the print plug-ins that have not been installed.

22. The method according to claim 21, wherein the information of the print plug-ins that have not been installed includes vendor names of the print plug-ins that have not been installed.

23. The method according to claim 13, wherein the first screen is displayed in a case where the instructed print plug-in has detected the printers.

24. The method according to claim 13, wherein the second screen is displayed in a case where the print plug-ins have been identified as print plug-ins that are corresponding to printers on a network and that have not been installed.

25. A non-transitory computer readable storage medium storing a computer-executable program of instructions for causing a computer to perform a method for an information processing apparatus, the method comprising:
    instructing an installed print plug-in including a printer search function to search for a printer;
    displaying a first screen including information of printers detected by the instructed print plug-in and a predetermined object for displaying a second screen; and
    displaying, based on receiving an instruction from a user for selecting the predetermined object, the second screen including information of print plug-ins that have not been installed, wherein the print plug-in include printer search functions.

26. The non-transitory computer readable storage medium according to claim 25, further comprising:
    storing information indicating whether each of a plurality of print plug-ins is in an enabled state or a disabled state,
    wherein each of the plurality of print plug-ins in the enabled state is instructed to search for a printer.

27. The non-transitory computer readable storage medium according to claim 25, further comprising instructing to search for a printer.

28. The non-transitory computer readable storage medium according to claim 25, wherein in a case where a plurality of print plug-ins on a network has not been installed, the information on the second screen includes at least a plurality of display items each for displaying a download site of a corresponding one of the plurality of print plug-ins that have not been installed.

29. An information processing apparatus comprising:
    a control unit including a processor and a memory, the control unit configured to:
    cause a display unit to display a list of printers detected by an installed print plug-in with a predetermined object, and
    cause the display unit to display, based on selection of the displayed predetermined object by a user, information of print plug-ins that have not been installed, wherein the print plug-ins have functions to search for printers.

30. The information processing apparatus according to claim 29, wherein the control unit causes the display unit to display, based on reception of an instruction to display a list of printers from the user, the list of the printers and the predetermined object.

31. The information processing apparatus according to claim 29, wherein the predetermined object is a predetermined button.

32. The information processing apparatus according to claim 29, wherein the control unit causes the display unit to display the information of the print plug-in that have not been installed, and erase the predetermined object from the display unit, based on the selection of the displayed predetermined object by the user.

33. The information processing apparatus according to claim 29, wherein, on a screen of the display unit where both the list of printers and the predetermined object are displayed, the information of the print plug-ins that have not been installed is not displayed.

34. The information processing apparatus according to claim 29,
wherein the control unit acquires, from printers on a network, information indicating vendors of the printers,
wherein the control unit identifies print plug-ins that have not been installed, from among print plug-ins corresponding to the acquired information indicating the vendors, and
wherein the information of the print plug-ins that have not been installed displayed on the display unit are the vendors of the identified print plug-ins.

35. The information processing apparatus according to claim 34, wherein the information indicating the vendors is acquired by using a print system function of the information processing apparatus.

36. The information processing apparatus according to claim 29, wherein each of the print plug-ins is software having a function of searching for a printer and generating a print job.

37. The information processing apparatus according to claim 29, wherein the control unit accesses, based on a predetermined operation being performed by the user in a state where the information of the print plug-ins that have not been installed is displayed, a download site for one of the print plug-ins that have not been installed.

38. The information processing apparatus according to claim 29, wherein the control unit causes the display unit to display, based on a predetermined operation being performed by the user in a state where the information of the print plug-in that has not been installed is displayed, a page for downloading one of the print plug-ins that have not been installed.

39. The information processing apparatus according to claim 29, wherein the installed print plug-in is the print plug-in that has been installed to the information processing apparatus, and the print plug-ins that have not been installed are the print plug-ins that have not been installed to the information processing apparatus.

40. The information processing apparatus according to claim 29, further comprising the display unit.

41. The information processing apparatus according to claim 29, wherein the information of the print plug-ins that have not been installed includes vendor names of the print plug-ins that have not been installed.

42. The information processing apparatus according to claim 29, wherein the information of the print plug-ins that have not been installed includes vendor names of printers that correspond to the print plug-ins that have not been installed.

43. The information processing apparatus according to claim 29, wherein the display unit is caused to display a screen that includes the list of printers, but does not include the information of the print plug-ins that have not been installed.

44. The information processing apparatus according to claim 29, wherein of the display unit is caused to display the list of printers is a case where the instructed print plug-in has detected the printers.

45. The information processing apparatus according to claim 29, wherein the display unit is caused to display the information in a case where the print plug-ins have been identified as print plug-ins that are corresponding to printers on a network and that have not been installed.

46. The information processing apparatus according to claim 29, wherein each of the print plug-ins includes a printer search function.

47. The information processing apparatus according to claim 29, wherein the list of printers and the predetermined object are displayed on a first screen that does not include vendor names of the print plug-ins that have not been installed.

48. The information processing apparatus according to claim 47, wherein the information of the print plug-ins that have not been installed includes vendor names of the print plug-ins that have not been installed.

49. An information processing apparatus comprising:
a control unit including a processor and a memory, the control unit configured to:
cause a display unit to display a list of printers received from an installed print plug-in with a predetermined object, and
cause the display unit to display, based on selection of the displayed predetermined object by a user, information of print plug-ins that have not been installed, wherein the print plug-ins have functions of detecting printers.

50. The information processing apparatus according to claim 49, wherein the information of the print plug-ins that have not been installed includes vendor names of the print plug-ins that have not been installed.

51. The information processing apparatus according to claim 49, wherein the information of the print plug-ins that have not been installed includes vendor names of printers that correspond to the print plug-ins that have not been installed.

52. The information processing apparatus according to claim 49, wherein the causing the display unit to display the list of printers does not include displaying the information of the print plug-ins that have not been installed.

53. The information processing apparatus according to claim 49, wherein the causing of the display unit to display the list of printers is in a case where the instructed print plug-in has detected the printers.

54. The information processing apparatus according to claim 49, wherein the display unit is caused to display the information in a case where the print plug-ins have been identified as print plug-ins that are corresponding to printers on a network and that have not been installed.

55. The information processing apparatus according to claim 49, wherein each of the print plug-ins includes a printer search function.

56. A method for an information processing apparatus comprising:
displaying a list of printers detected by an installed print plug-in with a predetermined object; and
displaying, based on selection of the displayed predetermined object by a user, information of print plug-ins that have not been installed, wherein the print plug-ins have functions of detecting printers.

57. The method according to claim 56, further comprising:
displaying, based on reception of an instruction to display a list of printers from the user, the list of printers and the predetermined object.

58. The method according to claim 56, wherein the predetermined object is a predetermined button.

59. The method according to claim 56, further comprising:
displaying the information of the print plug-ins that have not been installed; and
erasing the predetermined object from a display unit, based on the selection of the displayed predetermined object by the user.

60. The method according to claim 56, wherein, on a screen of a display where both the list of the printers and the predetermined object are displayed, the information of the print plug-ins that have not been installed are not displayed.

61. The method according to claim 56, further comprising:
acquiring, from printers on a network, information indicating vendors of the printers; and
identifying the print plug-ins that have not been installed, from among print plug-ins corresponding to the acquired information indicating the vendors,
wherein the information of the print plug-ins that have not been installed displayed on the display unit is the vendors of the identified print plug-ins.

62. The method according to claim 61, wherein the information indicating the vendor is acquired by using a print system function of the information processing apparatus.

63. The method according to claim 56, wherein each of the print plug-ins is software having a function of searching for a printer and generating a print job.

64. The method according to claim 56, further comprising:
accessing, based on a predetermined operation being performed by the user in a state where the information of the print plug-ins that have not been installed is displayed, a download site of one of the print plug-ins that have not been installed.

65. The method according to claim 56, further comprising:
displaying, based on a predetermined operation being performed by the user in a state where the information of the print plug-ins that have not been installed is displayed, a page for downloading one of the print plug-ins that have not been installed.

66. The method apparatus according to claim 56, wherein the installed print plug-in is the print plug-in that has been installed to the information processing apparatus, and the print plug-ins that have not been installed are the print plug-ins that have not been installed to the information processing apparatus.

67. An information processing apparatus comprising:
a control unit including a processor and a memory, the control unit configured to:
cause a display unit to display a first screen including a list of printers detected by an installed print plug-in with a predetermined object, but not including vendor names of print plug-ins that have not been installed, and
cause the display unit to display on a second screen, based on selection of the displayed predetermined object by a user, the vendor names of the print plug-ins that have not been installed.

68. The information processing apparatus according to claim 67, wherein the control unit causes the display unit to display, based on reception of an instruction to display a list of printers from the user, the list of printers and the predetermined object.

69. The information processing apparatus according to claim 67, wherein the predetermined object is a predetermined button.

70. The information processing apparatus according to claim 67, wherein the control unit causes the display unit to display the vendor names of the print plug-ins that have not been installed, and erase the predetermined object from the display unit, based on selection of the displayed predetermined object by the user.

71. The information processing apparatus according to claim 67, wherein the control unit causes the display unit to display, based on reception of an instruction to display a list of printers from the user, the list of printers and the predetermined object.

72. The information processing apparatus according to claim 67,
wherein the control unit acquires, from printers on a network, information indicating vendor names of the printers,
wherein the control unit identifies print plug-ins that have not been installed, from among print plug-ins corresponding to the acquired information indicating the vendor names, and
wherein the vendor names of the print plug-ins that have not been installed displayed on the display unit is the vendor names of the printers on the network corresponding to the identified print plug-ins.

73. The information processing apparatus according to claim 72, wherein the information indicating the vendor names is acquired by using a print system function of the information processing apparatus.

74. The information processing apparatus according to claim 67, wherein each of the print plug-ins is software having a function of searching for a printer and generating a print job.

75. The information processing apparatus according to claim 67, wherein the control unit accesses, based on a predetermined operation being performed by the user in a state where the vendor names of the print plug-ins that have not been installed are displayed, a download site for one of the print plug-ins that have not been installed.

76. The information processing apparatus according to claim 67, wherein the control unit causes the display unit to display, based on a predetermined operation being performed by the user in a state where the vendor names of the print plug-ins that have not been installed are displayed, a page for downloading one of the print plug-ins that have not been installed.

77. The information processing apparatus according to claim 67, wherein the installed print plug-in is to the print plug-in that has been installed to the information processing apparatus, and the print plug-ins that have not been installed are the print plug-ins that have not been installed to the information processing apparatus.

78. The information processing apparatus according to claim 67, wherein the second screen is displayed in a case where the print plug-ins have been identified as print plug-ins that are corresponding to printers on a network and that have not been installed.

79. The information processing apparatus according to claim 67, wherein each of the print plug-ins includes a printer search function.

80. A method for an information processing apparatus comprising:
displaying a first screen including a list of printers detected by an installed print plug-in with predetermined object, but not including vendor names of print plug-ins that have not been installed; and displaying a second screen, based on selection of the displayed predetermined object by a user, the vendor names of the print plug-ins that have not been installed.

81. The method according to claim 80, further comprising:

displaying, based on reception of an instruction to display a list of printers from the user, the list of printers and the predetermined object.

82. The method according to claim 80, wherein the predetermined object is a predetermined button.

83. The method according to claim 80, further comprising:

displaying the vendor names of the print plug-ins that have not been installed; and erasing the predetermined object from a display unit, based on selection of the displayed predetermined object by the user.

84. The method according to claim 80, further comprising:

displaying, based on reception of an instruction to display a list of printers from the user, the list of printers and the predetermined object.

85. The method according to claim 80, further comprising:

acquiring, from printers on a network, information indicating vendor names of the printers; and identifying print plug-ins that have not been installed, from among print plug-ins corresponding to the acquired information indicating the vendor names, wherein the vendor names of the print plug-ins that have not been installed displayed on the display unit is the vendor names of the printers on the network corresponding to the identified print plug-ins.

86. The method according to claim 85, wherein the information indicating the vendor names is acquired by using a print system function of the information processing apparatus.

87. The method according to claim 80, wherein each of the print plug-ins is software having a function of searching for a printer and generating a print job.

88. The method according to claim 80, further comprising:

accessing, based on a predetermined operation being performed by the user in a state where the vendor names of the print plug-ins that have not been installed are displayed, a download site for one of the print plug-ins that have not been installed.

89. The method according to claim 80, further comprising:

displaying, based on a predetermined operation being performed by the user in a state where the vendor names of the print plug-ins that as have not been installed are displayed, a page for downloading one of the print plug-ins that have not been installed.

90. The method apparatus according to claim 80, wherein the installed print plug-in is to the print plug-in that has been installed to the information processing apparatus, and the print plug-ins that have not been installed are the print plug-ins that have not been installed to the information processing apparatus.

\* \* \* \* \*